Oct. 27, 1970     L. SCHOMANN ET AL     3,536,422
INTAKE SAFETY DEVICE FOR FLUID PUMPS
Filed Oct. 14, 1968
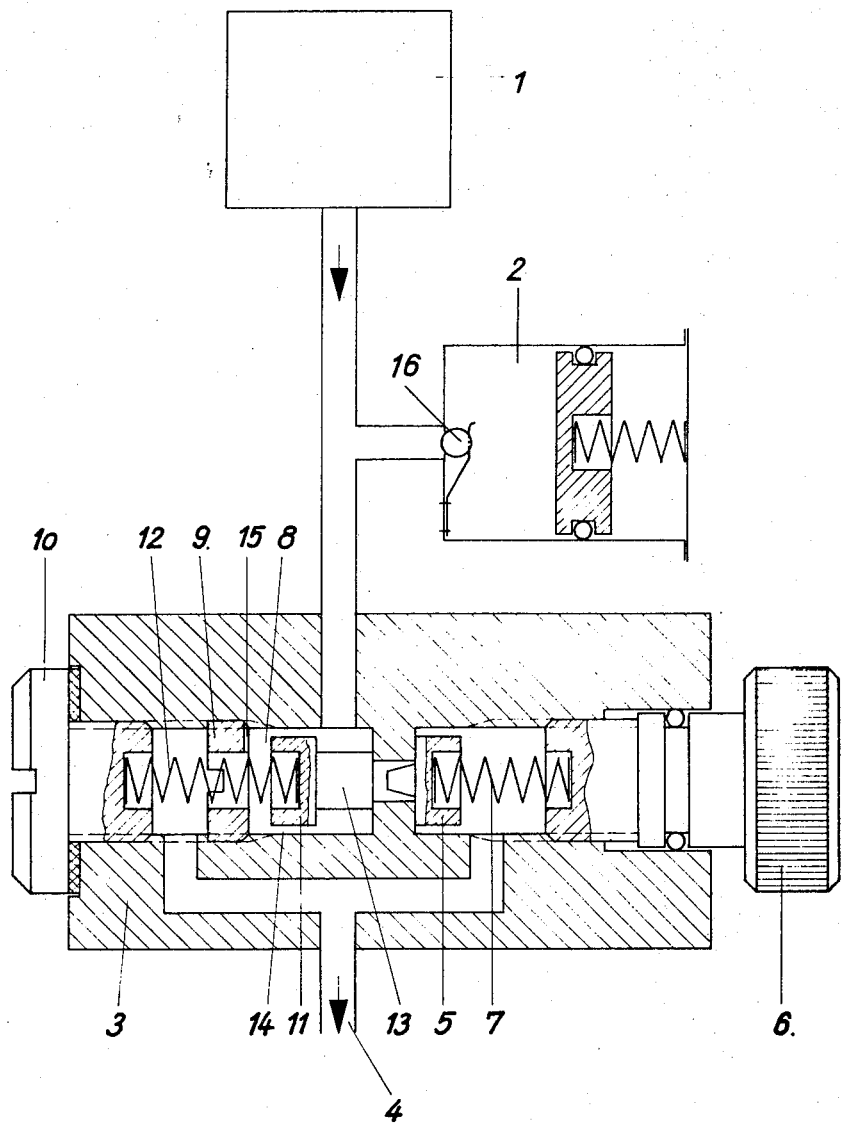
INVENTORS:
LEONID SCHOMANN
JOSEF HALANKE
BY
Darbo, Robertson &
Vandenburgh   Attys.

United States Patent Office 3,536,422
Patented Oct. 27, 1970

3,536,422
INTAKE SAFETY DEVICE FOR FLUID PUMPS
Leonid Schomann, Wuppertal-Barmen, and Josef Halanke, Mulheim (Ruhr), Germany, assignors to Alfred Eckerfeld, Langenberg, Germany
Filed Oct. 14, 1968, Ser. No. 767,301
Claims priority, application Germany, Oct. 27, 1967, 1,653,699
Int. Cl. F04b *11/00, 19/00, 21/02*
U.S. Cl. 417—299                    9 Claims

ABSTRACT OF THE DISCLOSURE

An unloader for a fluid pump has a valve body with an inlet, an outlet and a passage between the two. An insert in the passage defines a valve seat. A closure on the upstream side of the seat is urged away from the seat by a spring. This closure is slightly smaller than the passage in cross-section to define a throttling cross-section therebetween so that with the pump operating, the pressure build-up on the upstream side of the closure will be greater than that on the downstream side whereby the pressure will force the closure against the seat against said spring. The seat has a groove forming a port to permit fluid flow through the valve when the closure is against the seat. A pressure relief valve in the body communicates with the passage upstream of the seat and also with the outlet.

BACKGROUND AND SUMMARY OF THE INVENTION

This invention relates to an intake safety device for fluid pumps, to whose delivery outlet a pressure chamber and a pressure-limiting valve are connected. Pumps of the kind specified are used to produce a pressurised fluid in a pressure chamber, for instance a pressure accumulator; conventionally the pressure is kept at a predetermined maximum value by a pressure-limiting valve.

Intake difficulties occur when the operation of a pump of the kind specified starts. It must be assumed that in the inoperative state the pump chamber is partially or completely filled with air. However, this volume of air is merely compressed by the pump in the pump chamber but is not delivered to the pressure chamber, so that the pump cannot take in enough fluid, if any.

These intake difficulties are obviated according to the invention by the fact that the pressure outlet is connected to atmosphere via a narrow throttling cross-section which can be closed against the force of a spring by a valve-closure member under the action of the pressure upstream of the throttling cross-section. In an arrangement of this kind, the volume of air in the pump chamber can escape via the narrow throttling cross-section to atmosphere, since the throttling cross-section does not offer any considerable resistance to the flow of air, and consequently no adequate rise in pressure occurs upstream of the throttling cross-section. Since in this way the volume of air in the pump chamber can escape via the narrow throttling cross-section when the pump starts, the pump sucks in fluid. However, the narrow throttling cross-section offers several times more resistance to the flow of fluid, so that a back-up pressure is produced upstream of the throttling cross-section by means of which via the valve-closure member the throttling cross-section is automatically closed. Upstream of the closed throttling cross-section, therefore, the full pressure of the fluid can build up. Conveniently, the valve-closure member or its valve seat is so constructed that in the closed position it still leaves a residual cross-section free. This mean that air enclosed in the fluid sucked in can still escape through the residual cross-section during operation of the pump.

In one embodiment of the invention, the throttling cross-section is formed by the clearance of a non-hermetic spring-loaded valve piston whose end is placed on a valve seat enclosing a flow orifice. The valve piston is forced away from its seat by the spring as long as only air passes through the non-hermetic piston. However, as soon as fluid tends to pass through the non-hermetic piston, the pressure back-up produced upstream of the piston valve overcomes the force of the spring, so that the piston valve is forced on to the valve seat and the passage is closed. Conveniently, it is disposed, together with the pressure-limiting valve in a common casing connected to the delivery outlet of the pump.

As a result of the automatically closing narrow throttling cross-section, before the pump starts operation the pressure chamber connected to the pump delivery outlet would be in communication with atmosphere—i.e., would be unpressurised. However, it is often desirable to maintain the pressure in the pressure chamber, for instance a pressure accumulator, before the pump starts again, in spite of the open throttling cross-section. To this end according to the invention the pressure chamber is connected via a non-return (check) valve to the delivery outlet of the pump upstream of the throttling cross-section.

DESCRIPTION OF THE DRAWING

The drawing illustrates an unloader and pressure relief valve in cross-section diagrammatically connected to a fluid pump and pressure accumulator.

DESCRIPTION OF SPECIFIC EMBODIMENT

A valve casing or body 3 has an inlet connected to a fluid pump 1 and to a pressure chamber (illustrated as a pressure accumulator) 2. The valve body defines an outlet 4 open to atmosphere and a bore defining a passage 8 between the inlet and outlet. A pressure relief valve includes a closure 5 urged against its seat in the bore by a spring 7, which spring also bears against a setting screw 6. The setting screw 6 permits adjustment of the force of spring 7 and thus the pressure in passage 8 at which the pressure relief valve will move away from its seat to permit fluid to flow to the outlet 4.

Threaded into the bore which defines passage 8 is a valve seat ring 9 and a closure screw 10.

Co-operating with the valve seat ring 9 is a valve-closure member 11 which is forced away from the valve seat ring 9 by a spring 12 bearing against the closure screw 10. Closure member 11 includes an attachment 13 which bears against the end of the cylinder bore 8. The valve closure member 11 takes the form of a non-hermetic piston, so that a narrow annular gap 14 (which defines a throttling cross-section) is left between the piston 11 and the wall of the cylinder bore 8. The valve seat surface of the valve seat ring 9 is formed with a notched portion 15 which forms a residual cross-section or port. The delivery outlet of the fluid pump 1 is at first connected to atmosphere via the annular gap 14 and the outlet duct 4 and the central opening in valve seat ring 9. When the pump 1 starts to operate, the volume of air still in the pump chamber can escape to atmosphere via the annular gap 14 so that the pump 1 can suck in fluid and deliver it to the delivery outlet. As the fluid delivered flows through the annular gap 14, it encounters therein a substantially higher resistance to flow than the emerging air. Consequently, a back-up pressure is produced upstream of the piston 11 which overcomes the force of the spring 12 and by which the end of the piston 11 is pressed against the valve seat ring 9, thus interrupting the connection to the outlet duct 4. A build-up of fluid pressure can then take place upstream of the piston 11 and in the pressure chamber 2, the maximum value of the build-up being limited in known manner by the pressure-limiting valve 5–7. When the piston valve 9, 11 is closed, the notched portion 15 leaves a residual cross-section free through which air enclosed in the fluid sucked in can still escape. However, the residual cross-section offers a very high resistance to the flow of fluid, so that it does not impede the build-up of the fluid pressure.

If the pressure chamber 2 is connected to the delivery outlet of the pump 1 via a check valve 16, the pressure in the pressure chamber 2 can be maintained when the pump 1 is inoperative or when it starts again, although the annular gap 14 is then open.

The dimensions of the annular gap 14 and the notched portion 15 are determined by the viscosity of the fluid used. The dimensions can be larger in proportion as the viscosity of the fluid is lower. It has been found that the annular gap 14 and the notched portion 15 can be of such dimensions that operations can be performed with water. The intake safety device according to the invention is more particularly important when the pump 1 has to be frequently switched on and off, as, for instance, when it is used for an Expresso coffee-making machine.

We claim:

1. An intake safety device for fluid pumps, to whose delivery outlet a pressure chamber and a pressure-limiting valve are connected, wherein the pressure outlet is connected to atmosphere via a narrow throttling cross-section which can be closed against the force of a spring by a valve-closure member under the action of the pressure upstream of said throttling cross-section, said valve-closure member cooperating with a valve seat member, and at least one of these members being so constructed that in the closure position a residual cross-section is left free to allow limited fluid communication across the valve defined thereby for permitting the slow relief of fluid from the upstream side of said member to the downstream side of the members when the valve closure member is against the valve seat member.

2. An intake safety device for fluid pumps according to claim 1, wherein the throttling cross-section is formed by the clearance of a non-hermetic spring-loaded valve piston whose edge is placed on a valve seat enclosing a flow orifice.

3. An intake device for fluid pumps according to claim 1, wherein said device is disposed, together with the pressure-limiting valve in a common casing connected to the delivery outlet of the pump.

4. An intake safety device for fluid pumps according to claim 1, wherein the pressure chamber is connected via a non-return valve to the delivery outlet of the pump upstream of the throttling cross-section.

5. In an apparatus comprising a fluid pump, and an unloader connected to said pump, the improvement wherein said unloader comprises:

a valve body having a discharge outlet, an inlet and a passage between said inlet and outlet, said body defining a valve seat member in said passage;

a valve closure member in said passage upstream of said seat member and movable toward and away from said seat member, said closure member including means for urging said closure member toward said seat member in response to fluid pressure upstream of said closure member being substantially in excess of fluid pressure downstream of said closure member; and spring means resiliently urging said closure member away from said seat member;

one of said members including port means allowing limited fluid communication between said inlet and said outlet for permitting the slow relief of fluid from the upstream side of said closure member when said closure member is seated on said seat member.

6. In an apparatus as set forth in claim 5, wherein said body has a bore communicating with said passage upstream of said seat member, said body defining a second seat having one side at said passage and an opposing side, said bore at said opposing side communicating with said outlet; and including a pressure relief closure abutting said opposing side of said second seat, and a spring urging said pressure relief closure against said opposing side.

7. In an apparatus as set forth in claim 6, including a pressure chamber communicating with said inlet, and a check valve between said chamber and said inlet positioned to prevent fluid flow from the interior of said chamber to said inlet.

8. In an apparatus as set forth in claim 7, wherein said closure member means is defined by the closure member being slightly smaller than said passage in cross-section to define a fluid throttling cross-section about the closure member so that when said fluid pump is supplying substantial fluid and said closure member is off its seat member said throttling cross-section will cause fluid pressure build-up on the upstream side of the closure member in excess of that downstream of the closure member to thereby force the closure member against its seat member.

9. In an apparatus as set forth in claim 5, wherein said closure member means is defined by the closure member being slightly smaller than said passage in cross-section to define a fluid throttling cross-section about the closure member so that when said fluid pump is supplying substantial fluid and said closure member is off its seat member said throttling cross-section will cause fluid pressure build-up on the upstream side of the closure member in excess of that downstream of the closure member to thereby force the closure member against its seat member.

References Cited

UNITED STATES PATENTS

| 995,401 | 6/1911 | Chewey | 230—27 |
| 1,133,792 | 3/1915 | Chewey | 230—27 |
| 1,207,436 | 12/1916 | Ohlsen | 230—27 |
| 1,421,309 | 6/1922 | Redfield | 230—27 |
| 1,428,981 | 9/1922 | Redfield | 230—27 |
| 1,667,154 | 4/1928 | Heywood | 230—27 |
| 1,934,758 | 11/1933 | Temple | 103—40 X |

WILLIAM L. FREEH, Primary Examiner

U.S. Cl. X.R.

417—302